Patented June 23, 1931

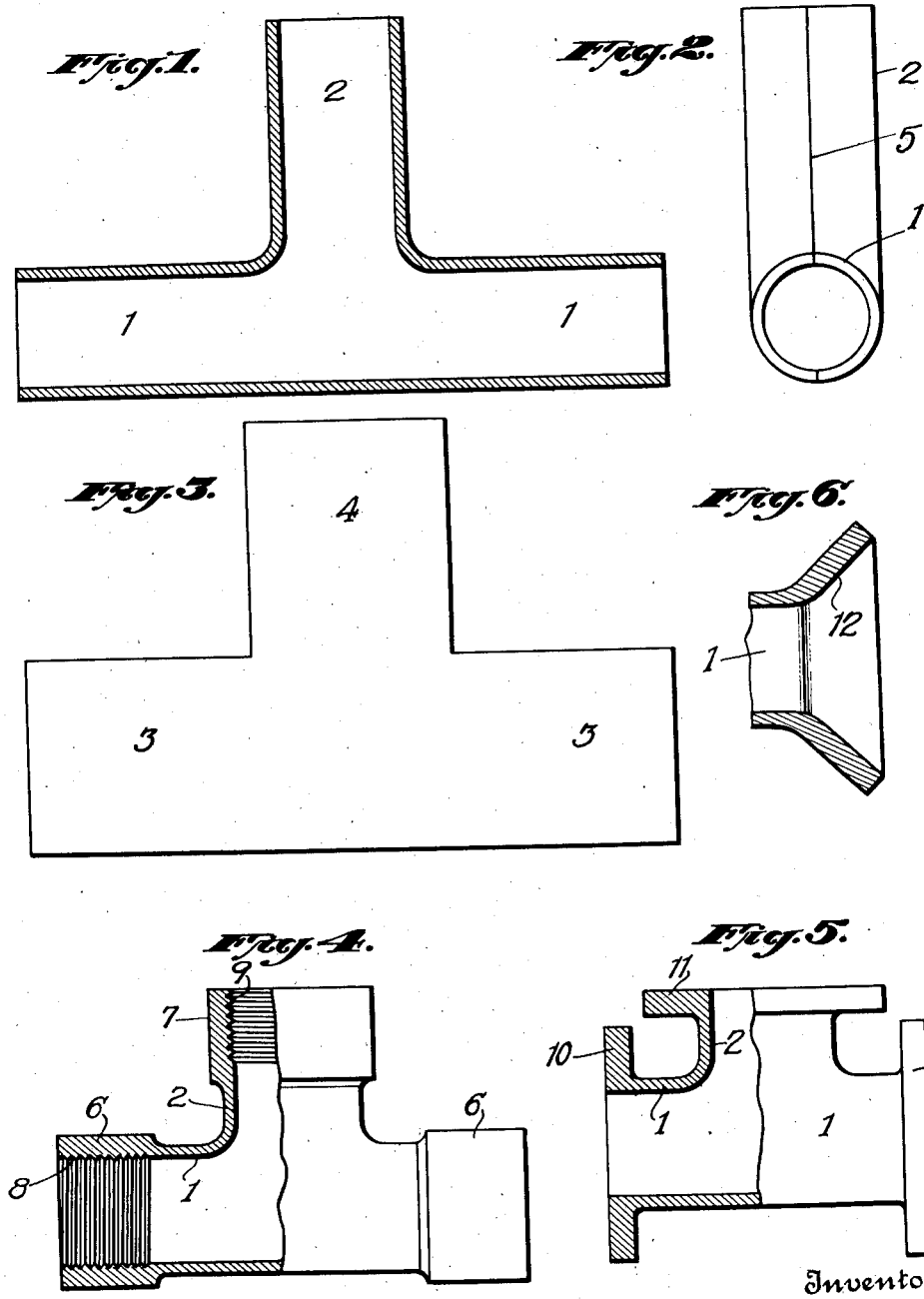

1,811,501

UNITED STATES PATENT OFFICE

HENRY S. HOLMES, OF ROCKVILLE CENTER, NEW YORK, ASSIGNOR, BY MESNE ASSIGNMENTS, TO METROPOLITAN ENGINEERING COMPANY, OF BROOKLYN, NEW YORK, A CORPORATION OF NEW YORK

PRODUCING PIPE FITTINGS AND OTHER HOLLOW ARTICLES

Application filed February 11, 1929. Serial No. 339,023.

The invention aims to provide improved T's, valve casings, L's and other hollow products and a method of production which is more economical than the methods now commonly used. The accompanying drawings illustrate the production of a T.

Fig. 1 is a longitudinal section of a tubular blank.

Fig. 2 is an end view of the same.

Fig. 3 is a flat blank from which the segments are bent up.

Fig. 4 is an elevation of a finished T partly in section.

Fig. 5 is a similar view of another style of T.

Fig. 6 is a section illustrating an intermediate step.

Hollow fittings and similar articles of the best quality are generally made by forging, starting with a thick billet or blank and using a drop hammer or press to reduce the walls where they are required to be comparatively thin.

I propose to reverse this method by making the tubular blank with thin walls and sufficiently elongated to provide the total quantity of metal needed and by upsetting the walls to form the thicker portions. Such a forging operation to thicken the metal is more easily executed than to thin it. Also the thin walled tubular blank is cheaply and easily made by stamping out segments of sheet metal of uniform thickness and welding the segments together.

Figs. 1 and 2 show such a blank made with longitudinal branches 1 and a lateral branch 2. This is made of two segments each made from a flat blank, Fig. 3. The ends 3 and the lateral branch 4 are bent to form the semi-circular portions 1 and 2, and two such segmental blanks are welded together along the central longitudinal line 5, Fig. 2.

In welding the segments it is best to use the Murray method in which the edges are pressed together while a current of very high amperage is passed across the joint for a brief period of time. See Reissue Patent No. 15,466, dated October 10th, 1922. I have found that such welds are peculiarly well adapted to resist the strain involved in the subsequent upsetting operations without cracking.

The fins produced by the welding operation are trimmed off and the thin walled tubular blank placed in the forging machine. The branches 1 are then compressed to form the upset ends 6, and the branch 2 to form the upset end 7. The increased thickness may be at the outside as shown, or it may be at the inside or partly at each side according to the design of the product desired. The shape in Fig. 4 is designed to be threaded internally at the ends as shown at 8 and 9.

Where a flanged fitting is required the ends are spread and bent down in the forging operation and thickened to form the flanges 10 and 11. The forging referred to may be effected in more than one operation. For example in making one of the end flanges 10 we may first thicken and bend the end to the oblique position 12, Fig. 6, and complete the operation in a subsequent step.

It has been proposed to forge segments of such fittings with wall portions of varying thickness and to weld such segments together. This, though more economical than the forging of the article in a single piece, presents difficulties in welding which are eliminated by the present method of welding segments having edges of uniform thickness throughout their length.

The invention may be applied to various other tubular products than pipe fittings. For example it may be applied to making the parts of axle housings as described and claimed specifically in a co-pending application of mine, No. 339,024, filed February 11, 1929.

Various other modifications may be made by those skilled in the art without departing from the invention as defined in the following claims.

What I claim is:—

1. The method of making a tubular product which consists in bending up sheet metal blanks to form segments, welding such segments together along longitudinal edges to form a thin-walled tubular blank and upsetting an end of said tubular blank by an endwise pressure to increase its thickness without diminishing its diameter.

2. The method of making a tubular product which consists in bending up sheet metal blanks to form segments, welding such segments together along longitudinal edges to form a thin-walled tubular blank and upsetting an end of said tubular blank by an endwise pressure to increase its thickness and to bend it outward to form a flange.

3. The method of forming a pipe fitting having branches at an angle with each other which consists in bending up a sheet metal blank to form segments, welding such segments together along longitudinal edges to form a tubular blank with uniform thin walls elongated to provide metal for upsetting, and upsetting the ends by an endwise pressure to increase their thickness without diminishing their diameter.

4. The method of forming a pipe fitting having branches at an angle with each other which consists in bending up a sheet metal blank to form segments, welding such segments together along longitudinal edges to form a tubular blank with uniform thin walls elongated to provide metal for upsetting, and upsetting the ends by an endwise pressure to increase their thickness and bending them outward to form flanges.

5. The method of claim 1, welding the segments by pressing the edges together while passing across the joint a current of extremely high amperage for a very brief period of time and thus making a joint capable of withstanding the strain of the subsequent upsetting operation.

6. A hollow article having a comparatively thin walled body portion made of sheet metal segments welded together along longitudinal joints and having a thickened end of at least as great a diameter as that of the adjacent unthickened portion, said thickened end being formed by an upsetting pressure in the direction of the joints.

7. A pipe fitting having a comparatively thin walled body portion made of sheet metal segments welded together along longitudinal joints and having thickened ends of at least as great a diameter as that of the adjacent unthickened portion, said thickened ends being formed by an upsetting pressure in a direction parallel to the joints at such ends.

In witness whereof, I have hereunto signed my name.

HENRY S. HOLMES.